United States Patent [19]

Takahashi

[11] 4,119,364
[45] Oct. 10, 1978

[54] DEVICE FOR DISPLAYING MAGNIFICATION IN THE FIELD OF VIEW OF A MICROSCOPE

[75] Inventor: Naoyuki Takahashi, Hino, Japan

[73] Assignee: Olympus Optical Company Ltd., Tokyo, Japan

[21] Appl. No.: 800,307

[22] Filed: May 25, 1977

[30] Foreign Application Priority Data

May 25, 1976 [JP] Japan .................................. 51-67753

[51] Int. Cl.² .......................................... G02B 21/06
[52] U.S. Cl. ..................................... 350/114; 350/40; 350/175 ML; 350/184
[58] Field of Search ...................... 350/14, 8, 180, 184, 350/185, 245, 40, 44, 175 ML, 226, 255, 19, 289, 275, 21, 20, 35, 19, 174, 115; 354/198

[56] References Cited

U.S. PATENT DOCUMENTS

| | | |
|---|---|---|
| 1,610,252 | 12/1926 | Browne .................................. 350/115 |
| 1,803,483 | 5/1931 | O'Meara ................................ 350/115 |
| 3,292,490 | 12/1966 | Moore .................................... 350/19 |
| 3,417,685 | 12/1968 | Kato et al. ............................. 350/19 |
| 3,507,987 | 4/1970 | Van Der Bosch ...................... 350/19 |
| 3,547,521 | 12/1970 | Ichizuka et al. ...................... 350/184 |
| 3,656,829 | 4/1972 | Wilms .................................... 350/19 |
| 3,839,724 | 10/1974 | Muryoi .................................. 354/198 |

Primary Examiner—John K. Corbin
Assistant Examiner—B. W. delos Reyes
Attorney, Agent, or Firm—Toren, McGeady and Stanger

[57] ABSTRACT

A magnification display device for displaying magnification on a part in the observation field of view or photographing field of view of a zoom type microscope. The device comprises a mirror frame for the microscope incorporating with a zoom lens, and a magnification display plate rotatably arranged in the mirror frame. A predetermined magnification on the magnification display plate is displayed in the field of view of observation optical system, photographing optical system or the like.

3 Claims, 2 Drawing Figures

FIG_1
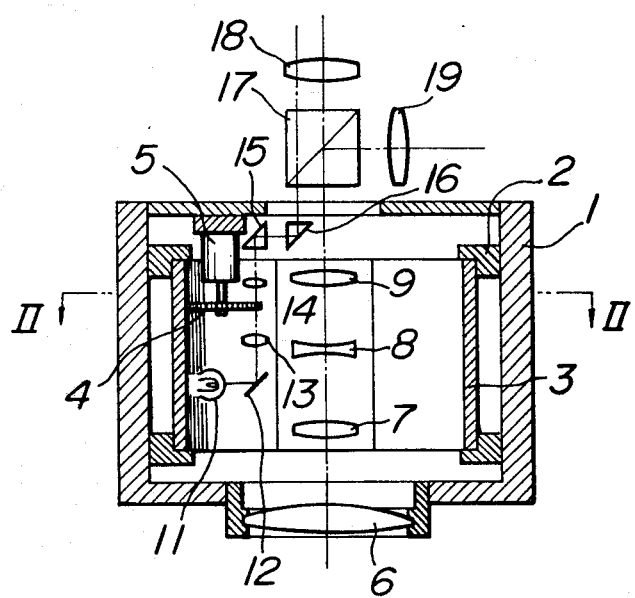
FIG.2
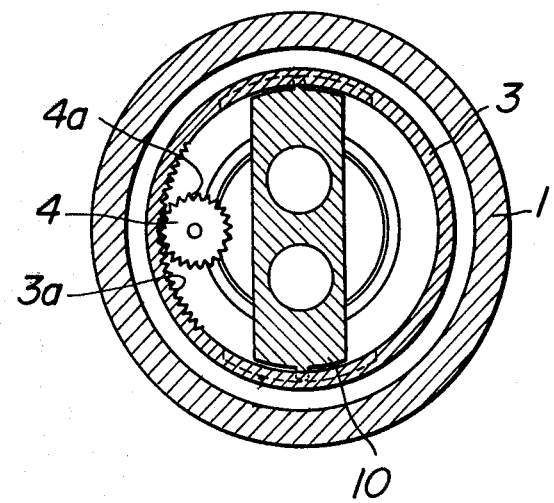

DEVICE FOR DISPLAYING MAGNIFICATION IN THE FIELD OF VIEW OF A MICROSCOPE

BACKGROUND OF THE INVENTION

1. Field of the Invention

The present invention relates to a magnification display device for displaying magnification on a part in the observation field of view or photographing field of view of a zoom-type microscope.

2. Description of the Prior Art

In case of observing or photographing an object with an optical apparatus provided with a zoom lens, display of magnification is made on the surface of the apparatus such as the surface of a mirror cylinder or the like, so that magnification of an objective lens or an eye lens should be confirmed every time when necessary, and thus observation and photographing are very inconvenient.

SUMMARY OF THE INVENTION

An object of the present invention is to provide a magnification display device in which magnification can be displayed in the observation field of view or photographing field of view of a zoom type microscope.

According to the present invention the magnification display device comprises a mirror frame for the microscope incorporating with a zoom lens, a magnification display plate rotatably arranged in the mirror frame, and said magnification display plate being rotated by interlocking with movement of the zoom lens to vary magnification, whereby a predetermined magnification on the magnification display plate is displayed in the field of view of observation optical system, photographing optical system or the like.

BRIEF DESCRIPTION OF THE DRAWING

FIG. 1 is a cross-sectional view of a magnification display device according to the present invention; and FIG. 2 is a cross-sectional view taken along the line II—II of FIG. 1.

DESCRIPTION OF THE PREFERRED EMBODIMENT

Referring now to FIGS. 1 and 2 one embodiment of a magnification display device according to the present invention is shown. In FIGS. 1 and 2 is shown the device used for a stereo microscope. Reference numeral 1 is a microscope mirror frame, reference numeral 2 is a guide provided in the mirror frame for rotating a cylindrical cam 3, reference numeral 4 is a magnification display plate for writing numerals or letters such as magnifications on a transparent plate with black letters or extracting letters or the like on an opaque plate, and around its periphery is formed a teeth 4a engaged with a teeth 3a formed in the cylindrical cam 3. Reference numeral 5 is an electric motor fixed to the mirror frame 1 and to its shaft is fixed the magnification display plate 4, so that the magnification display plate is rotated by rotation of the motor 5 and the cylindrical cam 3 is also rotated. Reference numeral 6 is an objective lens, and reference numerals 7, 8 and 9 are relay lenses, each two of which is arranged and maintained in a mirror cylinder 10 as shown in FIG. 2. This mirror cylinder 10 is constructed to move a special lens as known for carrying out zooming by rotation of the cylindrical cam. Reference numeral 11 is a light source, 12 a mirror, 13 a lens for illumination, 14 a projection lens, 15, 16 total reflection prisms, 17 a light splitting prism, and reference numerals 18, 19 are image-forming lenses.

The function of the present invention will be explained. At first, photographing and observation of an object through the objective lens are made by passing or reflecting the objective lens 6, the relay lenses 7, 8, 9 and the light splitting prism 17, and an image of the object is formed by passing through each image-forming lens. On the other hand, the magnification display plate 4 is illuminated by illumination light from the light source 11, i.e., by illumination light reflected by the mirror 12 and converged by the illumination lens 13. The numeral for indicating magnification on the magnification display plate 4 is projected by the projection lens 14, reflected by the prisms 15, 16, passed through or reflected on the light splitting prism 17 and imaged around the field of view at the same position as that where an image is formed. In this case, when the motor 5 is rotated and thus the magnification display plate 4 is rotated, the numeral formed at the image position on the magnification display plate is changed. At the same time, if the magnification display plate 4 is rotated, the cylindrical cam 3 engaged with the teeth 4a formed around the magnification display plate 4 is also rotated, thereby moving the relay lenses 7, 8 and 9 for changing magnification of an object image. With the rotation of the magnification display plate 4 the letter on an optical axis of the optical system for projecting the letter on the magnification display plate 4 corresponds to the magnification changed by movement of the relay lens caused by the rotation of the cylindrical cam, and as a result, the magnification of an image formed by the objective lens, relay lenses and image-forming lens is displayed on the peripheral portion of the image.

In this embodiment, the magnification display plate 4 is rotated by a motor and this rotation is transmitted to the cylindrical cam, but it is preferable to rotate the cylindrical cam and transmit it to the magnification display plate 4. Further, it is also preferable to carry out this rotation by hand with the use of a lever.

As explained above, according to the present invention, the magnification of the object image can be displayed around the image, so that it is not necessary to confirm the magnification of the image by magnification display provided on the mirror cylinder or the like of a microscope during observation. Further, in case of photographing, the magnification is also photographed, so that it is not necessary to write the magnification after photographing.

What is claimed is:

1. A device for displaying magnification in the field of view of a microscope comprising a mirror frame for the microscope incorporating with a zoom lens, a magnification display plate rotatably arranged in the mirror frame, and said magnification display plate being rotated by interlocking with movement of the zoom lens to vary magnification, whereby a predetermined magnification on the magnification display plate is displayed in the field of view of observation optical system, photographing optical system or the like.

2. A device as claimed in claim 1, wherein said magnification display plate includes a transparent plate on which black letters such as numerals or letters are written.

3. A device as claimed in claim 1, wherein said magnification display plate includes an opaque plate on which numerals or letters are punched out.

* * * * *

UNITED STATES PATENT OFFICE
CERTIFICATE OF CORRECTION

Patent No. 4,119,364          Dated October 10, 1978

Inventor(s)    NAOYUKI TAKAHASHI

It is certified that error appears in the above-identified patent and that said Letters Patent are hereby corrected as shown below:

In the heading of the patent [30] should read as follows:

[30]    Foreign Application Priority Data

May 28, 1976 [JP]      Japan................51-67753

Signed and Sealed this

Twenty-third Day of January 1979

[SEAL]

Attest:

RUTH C. MASON
*Attesting Officer*

DONALD W. BANNER
*Commissioner of Patents and Trademarks*